(12) United States Patent
Bailiang et al.

(10) Patent No.: US 9,323,420 B2
(45) Date of Patent: Apr. 26, 2016

(54) FLOOR SELECTION ON AN INTERACTIVE DIGITAL MAP

(71) Applicants: Zhou Bailiang, Balgowlah (AU); Jonah Jones, San Francisco, CA (US)

(72) Inventors: Zhou Bailiang, Balgowlah (AU); Jonah Jones, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 420 days.

(21) Appl. No.: 13/853,723

(22) Filed: Mar. 29, 2013

(65) Prior Publication Data

US 2014/0013263 A1  Jan. 9, 2014

Related U.S. Application Data

(63) Continuation of application No. 13/541,292, filed on Jul. 3, 2012, now Pat. No. 8,464,181.

(51) Int. Cl.
*G06F 3/048* (2013.01)
*G06F 3/0481* (2013.01)
*G09B 29/10* (2006.01)

(52) U.S. Cl.
CPC .......... *G06F 3/04815* (2013.01); *G09B 29/106* (2013.01)

(58) Field of Classification Search
CPC ............................. G06F 3/017; G06F 3/04815
See application file for complete search history.

(56) References Cited

U.S. PATENT DOCUMENTS

| | | | |
|---|---|---|---|
| 6,912,462 B2 * | 6/2005 | Ogaki ................................ 703/1 |
| 7,075,512 B1 | 7/2006 | Fabre et al. | |
| 7,469,381 B2 | 12/2008 | Ording | |
| 7,567,844 B2 | 7/2009 | Thomas et al. | |
| 7,760,187 B2 | 7/2010 | Kennedy | |
| 7,786,975 B2 | 8/2010 | Ording et al. | |
| 7,954,070 B2 | 5/2011 | Plocher et al. | |
| 7,956,847 B2 | 6/2011 | Christie | |
| 7,958,456 B2 | 6/2011 | Ording et al. | |
| 8,233,008 B2 | 7/2012 | Jin et al. | |
| 8,464,181 B1 | 6/2013 | Bailiang et al. | |
| 8,581,698 B2 * | 11/2013 | Ledlie et al. ................... 340/8.1 |
| 2002/0091793 A1 | 7/2002 | Sagie | |
| 2004/0268232 A1 | 12/2004 | Tunning | |
| 2010/0115455 A1 * | 5/2010 | Kim ..................... G06F 3/04815 715/781 |

(Continued)

OTHER PUBLICATIONS

"Floor Plan Navigation," YouTube video (Aug. 18, 2009). Retrieved from the Internet on Jul. 10, 2012: URL:http://www.youtube.com/watch?v=v1kcdOQrgvc.

(Continued)

*Primary Examiner* — Omar Abdul-Ali
(74) *Attorney, Agent, or Firm* — Marshall, Gerstein & Borun LLP

(57) ABSTRACT

A digital map of a geographic area is displayed via a user interface, and a 3D representation of a multi-story building located in the geographic area is displayed on the digital map. The 3D representation includes multiple stacked, individually selectable floor maps corresponding to the floors of the multi-story building. A scrolling gesture over a point within the 3D representation of the building, that includes a motion in a direction substantially along a vertical axis of the 3D representation of the building, is received. In response, the floor maps are consecutively activated, and visual attributes of the activated floor map are changed relative to every other floor maps in the 3D representation, so that no more than one of floor maps is activated at one time.

17 Claims, 5 Drawing Sheets

(56) References Cited

U.S. PATENT DOCUMENTS

2013/0145293 A1* 6/2013 Yoakum et al. .............. 715/764
2013/0174087 A1* 7/2013 Chen ..................... G06F 3/0488
                                                            715/800

OTHER PUBLICATIONS

"GAB RTLS Indoor Navigation The "Killer" App Everybody Waited For," YouTube video (Oct. 6, 2011). Retrieved from the Internet on Jul. 10, 2012: URL:http://www.youtube.com/watch?v=RekZ200xe20.

"Google Maps 6.0 for Android Smartphones Updated with Indoor Maps," YouTube video (Nov. 29, 2011). Retrieved from the Internet on Jul. 10, 2012: URL:http://www.youtube.com/watch?v=ubU5RFovOgo.

"Moi Indoor Navigation Touch Screens," Bëhance (Nov. 25, 2011). Retrieved from the Internet on Jul. 10, 2012: URL:http://www.behance.net/gallery/Moi-indoor-Navigation-Touch-Screens/2466609.

"Nokia Maps Indoor Spaces," Patexia video (May 1, 2012.). Retrieved from the Internet on Jul. 10, 2012: URL:http://www.patexia.com/feed/nokia-maps-indoor-spaces-4093.

Isaac, "New Version of Google Maps Brings Indoor Floor Plans to Your Phone," Gabget Lab; Wired (Nov. 29, 2011). Retrieved from the Internet on Jul. 10, 2012: URL:http://www.wired.com/gabgetlab/2011/11/google-maps-indoor-update/.

Kumparak, "Tiny Tower Developers Call Out Zynga for Copying Their Game (After They Refused to be Acquired)," TechCrunch (Jan. 24, 2012). Retrieved from the Internet on Jul. 10, 2012: URL:http://techcrunch.com/2012/01/24/tiny-tower-developers-call-out-zynga-for-their-look-alike-game/.

Olwal et al., "Rubbing and Tapping for Precise and Rapid Selection on Touch-Screen Displays," *Proceedings of CHI 2008 (SIGCHI Conference on Human Factors in Computing Systems)*, pp. 295-304 (Apr. 5-10, 2008).

* cited by examiner

FLOOR SELECTION ON AN INTERACTIVE DIGITAL MAP

CROSS-REFERENCE TO RELATED APPLICATION

This application claims priority to U.S. application Ser. No. 13/541,292 filed on Jul. 3, 2012, and titled "Floor Selection on an Interactive Digital Map," the entire disclosure of which is hereby expressly incorporated by reference herein.

FIELD OF THE DISCLOSURE

The present disclosure relates to interactive digital maps and, more particularly, to providing an interface for interacting with representations of multi-story buildings displayed as part of digital maps on a computing device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, a wide variety of computing devices, including many portable devices, support software applications that display interactive digital maps ("mapping applications"). For example, mapping applications may run on laptop and tablet computers, mobile phones, car navigation systems, hand-held global positioning system (GPS) units, etc. Many of these devices are equipped with a touchscreen, a touchpad, or are otherwise configured to receive input that includes finger gestures. A user may, for example, may pan across a map by swiping her finger in the desired direction, zoom in on an area by pinching two fingers together, etc.

In general, a mapping application can display various types of geographic data including topographical data, street data, urban transit information, and traffic data. Further, the geographic data may be schematic or based on photography, such as satellite imagery. Still further, a mapping application can display the information in a two-dimensional (2D) or three-dimensional (3D) format.

A user sometimes may operate a mapping application to view a map of an urban area rendered two-dimensionally and schematically to better see street names, names of landmarks, etc. However, such maps may include multi-story buildings for which additional floor-specific information is available. For example, different information may be available for each of ten floors of a building, and it is difficult for a mapping application to display this information two-dimensionally without creating confusion and clutter. On the other hand, displaying information for a multi-story building as part of a 3D map can result in some of the information being obscured.

SUMMARY

One embodiment of the techniques discussed below is a method for providing an interactive display of multi-story buildings displayed on a map. The method is implemented in a computing device having a user interface that is configured to receive gesture-based input. The method includes displaying a digital map of a geographic area via the user interface and displaying, on the digital map, a three-dimensional (3D) representation of a multi-story building located in the geographic area, including displaying a plurality of stacked, individually selectable floor maps corresponding to a plurality of floors of the multi-story building. The method also includes detecting, via the user interface, a scrolling gesture over a point within the 3D representation of the building that includes a motion in a direction substantially along a vertical axis of the 3D representation of the building and consecutively activating the plurality of floor maps in response to detecting the scrolling gesture, including changing visual attributes of the activated floor map relative to every other one of the plurality of floor maps, where no more than one of the plurality of floor maps is activated at one time.

Another embodiment of the techniques described in the present disclosure is a method in a computing device for providing a digital map of outdoor and indoor locations via a user interface. The method includes displaying a digital map of a geographic area within a viewport on the user interface, where the digital map includes a plurality of map elements representing outdoor physical entities. The method also includes displaying an external representation of a multi-story building located in the geographic area within the viewport, and receiving a selection of a point on the digital map via the user interface. Still further, the method includes, in response to determining that the selected point is within the external representation of the multi-story building, generating an expanded representation of the multi-story building, including simultaneously displaying a plurality of floor maps corresponding to different floors of the multi-story building, and activating a display of one of the plurality of floor maps in response to detecting a gesture that operates directly on the expanded representation of the multi-story building. Finally, the method includes, in response to determining that the selected point is outside the external representation of the multi-story building, providing a plurality of functions for changing the display of the plurality of map elements representing outdoor physical entities.

Still another embodiment of the techniques discussed below is a method for providing an interactive display of multi-story buildings displayed on a map. The method is implemented in a computing device having a user interface that is configured to receive gesture-based input. The method includes displaying a digital map of a geographic area via the user interface and displaying, on the digital map, a three-dimensional (3D) representation of a multi-story building located in the geographic area, including displaying a plurality of stacked, individually selectable floor maps corresponding to a plurality of floors of the multi-story building. The method also includes detecting, via the user interface, a gesture that operates directly on a point within the 3D representation of the multi-story building, and activating one of the plurality of floor maps in response to detecting the gesture, including changing visual attributes of the activated floor map relative to every other one of the plurality of floor maps.

DETAILED DESCRIPTION

Figure 1:
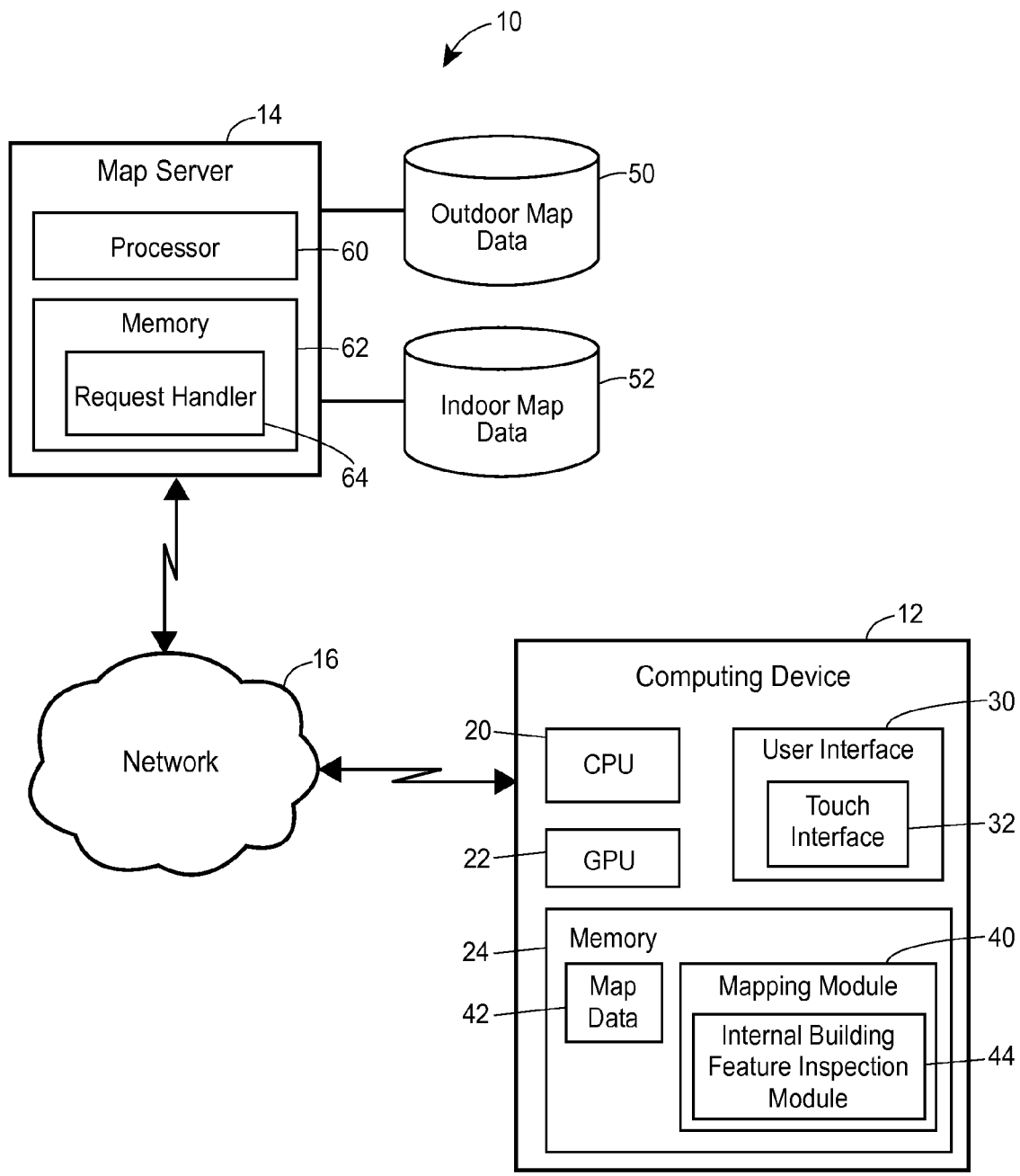
FIG. 1 is a block diagram of an example system in which techniques for presenting internal features of a multi-floor building in a mapping application are implemented.

A mapping software module operating on a computing device displays an interactive digital map of a geographic region in which a multi-story building is located. The mapping software module provides an intuitive, space-efficient, and aesthetically pleasing user interface for inspecting the internal features of the multi-story building, such as floor maps that include floor contours as well as internal wall layout and names of individuals or organizations occupying different floors of the building.

In one example implementation, the mapping software module displays a 2D schematic map that includes low-detail 3D outlines of buildings, which may be displayed to scale with the map. A user selects the desired building by tapping on the corresponding 3D outline. The mapping software module then expands the low-level outline view of the selected multi-story building to display the internal features of the building as a 3D stack of individually selectable floor contours, each illustrated in a perspective view. The 3D stack in some cases is significantly larger than the low-detail 3D outline, so that the floor contours are clearly visible and easily selectable. The mapping software module allows the user to activate the display of and an individual floor map via a gesture that operates directly on the expanded representation of the multi-story building. When a particular floor is selected using a tap gesture, for example, the mapping software module brings the corresponding floor map to the foreground and makes the relevant features fully visible. For example, when one of the floors of a multi-story airport terminal is selected, the mapping module may display the check-in counters, escalators, stores, etc. located on the selected floor. These features may obscure some or all of features on the other floors, but the stacked floor contours remain visible and available for direct selection by tapping or clicking. Once the user taps outside this expanded representation of the multi-story building, the mapping software module "collapses" the view of the multi-story building back to a 3D outline.

According to one example implementation on a computing device equipped with a touchpad or a touchscreen, the mapping software module allows the user to scroll through the floor maps using the swipe gesture. More specifically, the user scrolls from the top floor down to the first floor by making a generally upward swiping motion with her finger, or from the bottom floor up to the top floor by making a generally downward motion with her finger (or, if desired, the floors can be scrolled in the direction of the motion). The mapping application also recognizes acceleration or another kinetic parameter of the gesture to scroll faster when the user makes a quick flinging motion. Thus, the user can quickly scroll through the floors of a sixty-story office building or slowly scroll through the floors of a three-story shopping mall, for example. The display of floor-specific information is activated and deactivated in the order of scrolling, thereby creating an animation effect. In other words, the mapping software module displays a "flow" of floor maps. The user taps on the desired floor to confirm her selection, or the mapping software module activates the map of the floor that remains in focus when the momentum of the swipe gesture is exhausted and scrolling stops.

These techniques are discussed in more detail below with reference to FIGS. 1-5. In particular, an example system in which a mapping software module may interactively present internal features of buildings is described with reference to FIG. 1, example screenshots of the mapping software module are discussed with reference to FIGS. 2 and 3, and example methods which the mapping software module may implement to provide a user interface for inspecting internal features of multi-story buildings are discussed with reference to FIGS. 4 and 5.

Referring first to FIG. 1, a system 10 includes a computing device 12 coupled to a map server 14 via a communication network 16. The computing device 12 can be, for example, a laptop computer, a tablet computer, a smartphone, etc. In the embodiment illustrated in FIG. 1, the computing device 12 includes a central processing unit (CPU) 20, a graphics processing unit (GPU) 22, a computer-readable memory 24, and a user interface 30 including a touch interface 32. In various implementations, the touch interface 32 can include a touchpad over which the user moves his fingers while looking at a separately provided screen, a touchscreen where the user places his fingers directly over the image being manipulated or over a displayed control being activated (e.g. a displayed keyboard), etc. The memory 24 is a computer-readable non-transitory storage device that may include both persistent (e.g., a hard disk) and non-persistent (e.g., RAM) memory components, stores instructions executable on the CPU 20 and/or the GPU 22 that make up a mapping software module 40 and map data 42 on which the mapping module 40 operates. The mapping software module 40 includes an internal building feature inspection module 44 that allows users to easily inspect internal features of multi-story buildings.

The mapping software module 40 according to various implementations operates as a separately executable software application, a plugin that extends the functionality of another software application such as a web browser, an application programming interface (API) invokable by a software application, etc. The instructions that make up the mapping software module 40 may be compiled and executable on the CPU 20 and/or the GPU 22 directly, or not compiled and interpreted by the CPU 20 at runtime. Further, the internal building feature inspection module 44 may be provided as an integral part of the mapping software module 40 or as a separately installable and downloadable component.

Depending on the implementation, the map data 42 may be in a raster format, such as Portable Network Graphics (PNG), a vector graphics format (based on mathematical descriptions of geometric shapes), or any other suitable format. The map data 42 in some cases is divided into map tiles, or portions of a map image having a certain fixed size, such as 256 by 256 pixels. In operation, the mapping module 40 receives the map data 42 from the map server 14, renders a map image based on the map data, and causes the map image to be displayed via the user interface 30. When the map data 42 is already rasterized, the mapping module 40 renders the map image by selecting and combining the proper rasterized tiles. However, if the map data 42 is in a vector graphics format, the mapping module 40 interprets the descriptions of various shapes to generate the corresponding raster images. The mapping module 40 also adjusts the displayed image and requests new map data, when necessary, in response to user input received via the user interface 30. More specifically, the user may change the zoom level, pan across the map, select a different map type (e.g., traffic map, terrain map), and otherwise interact with the map.

In an example scenario, the map server 14 receives a request that specifies the geographic area, the zoom level, and the map type. The map server 14 in response retrieves outdoor map data and indoor map data from an outdoor map database 50 and an indoor map database 52, respectively. The map server 14 then provides the outdoor map data, the indoor map data, and appropriate indications of how certain portions of the outdoor map data and the indoor map data are linked, to the computing device 12 as part of the map data 42.

When provided in a vector graphics format, outdoor map data may specify individual map elements representing such physical entities as roads, parks, bodies of water, external walls of buildings, and other natural and artificial objects visible outside, e.g., from above or at a street level. In a raster format, map elements typically are embedded into the same image. Outdoor map also may include text-based data for displaying various labels such as street names or names of landmarks. In general, outdoor map data may be for generating 2D images or 3D images, and may include schematic data, photographic images, or both.

Indoor map data may specify internal features of buildings such as the layout of internal walls or dividers, names of people, businesses, and organizations occupying different portions of a building, locations of elevators, escalators, restrooms, etc. For multi-story buildings, the indoor map data may specify internal features on a per-floor basis. Similar to outdoor map data, indoor map data may include both graphics content and non-graphics (e.g., text) content, and the graphics content may include schematic illustrations, photographic images, interactive and non-interactive icons, etc.

Certain portions of the outdoor map data may be logically linked to respective portions of indoor map data. In particular, certain map elements displayed on a map may be linked to indoor data that typically is not displayed on the map without an additional user request. In other words, certain map elements may be associated with additional map data that is not part of the map image typically displayed for the specified geographic region, map type, and zoom level. Referring to the map data 42, the map server 14 can provide outdoor map data as a collection of separate data structures, each containing a vector-based description of a map element, text-based label data, and metadata that further contains a unique identifier of another data structure storing the corresponding indoor map data. If the outdoor map data included in the map data 42 is rasterized, the unique identifier of a data structure storing indoor map data can be provided for a particular set of coordinates in the raster image. In either case, the mapping software module 40 can display the outdoor map data and provide interactive controls for activating the display of relevant indoor map data.

As a more specific example, according to one implementation, the map server 14 provides, as part of outdoor map data, external representations of buildings in the form of low-detail 3D outlines. The mapping software module 40 superimposes these 3D outlines over a 2D map. In another implementation, the map server 14 provides 3D mesh descriptions of buildings along with photographic imagery for texturing the corresponding 3D meshes. Using this type of map data, the mapping software module 40 can generate realistic, highly detailed external representations of buildings. In yet another implementation, the map server 14 provides merely 2D outlines, or "footprints" of buildings on a 2D map. A user can tap or click on these 2D or 3D external representations of buildings to instruct the mapping software module 40 to display the internal features of the buildings in an expanded format.

With continued reference to FIG. 1, the map server 14 may include a processor 60 and a memory 62 that stores a request processor 64, made up of instructions executable on the processor 60. The computing device 12 and the map server 14 may communicate in a client-server mode, where the computing device 12 sends requests for map data to the map server 14, and the map server 14 provides map data in response to these requests. More particularly, the request processor 64 in operation receives requests for map data from the computing device 12, identifies and retrieves the requisite map data from the outdoor map database 50 and/or the indoor map database 52, formats response messages that contain the map data, and causes the response messages to be transmitted to the computing device 12 via the network 16, which may be a wide area network (WAN) such as the Internet, a local area network (LAN), or any other suitable type of a network.

For simplicity, FIG. 1 illustrates the map server 14 as only one instance of a server device. However, the map server 14 according to some implementations includes in a group of one or more map server devices, each equipped with one or more processors and capable of operating independently of the other map server devices. Map server devices operating in such a group can process requests from the computing device 12 individually (e.g., based on availability), in a distributed manner where one operation associated with processing a request is performed on one map server device while another operation associated with processing the same request is performed on another map server device, or according to any other suitable technique. For the purposes of this discussion, the term "map server" may refer to an individual map server device or to a group of two or more map server devices.

Figure 2:
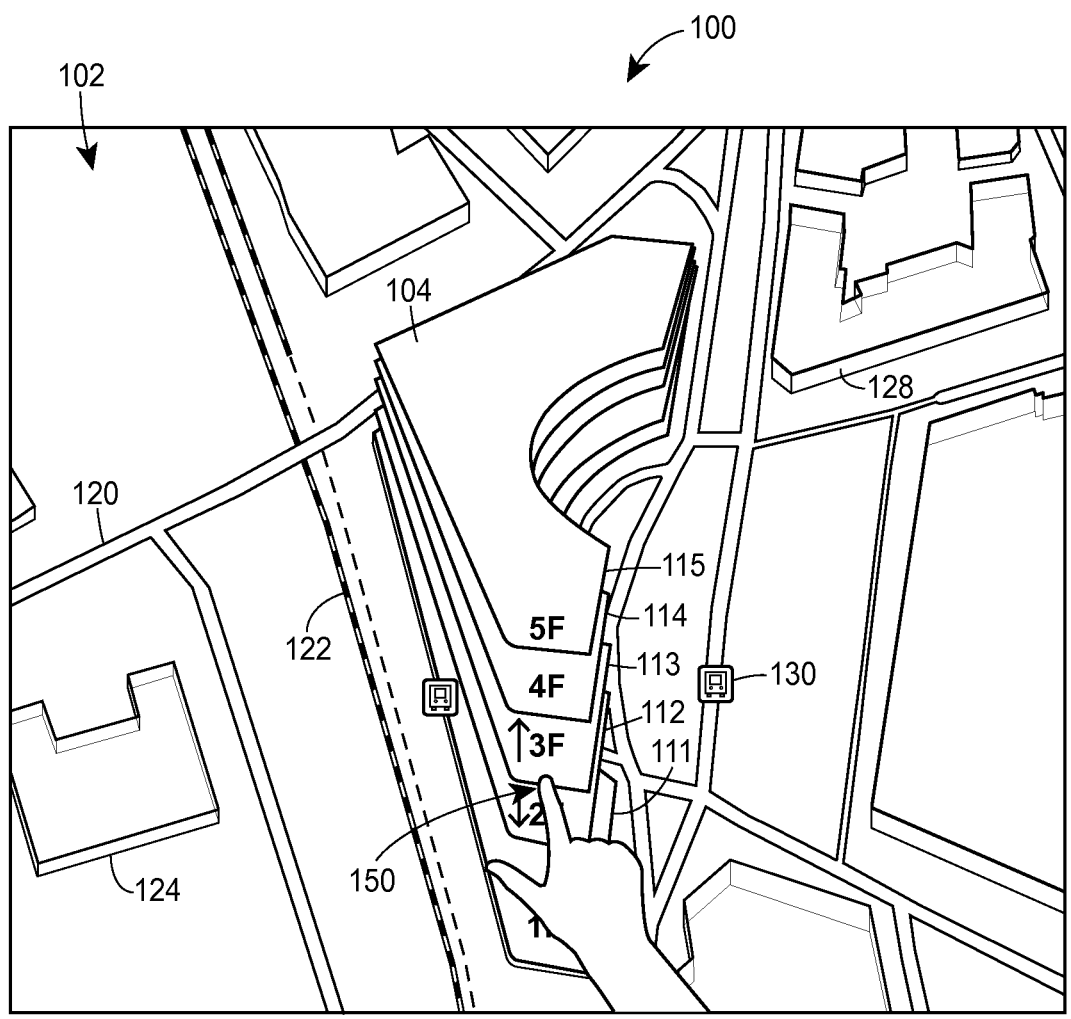
FIG. 2 is an example screenshot that illustrates the display of a multi-story building on a map as several stacked, individually selectable floor maps.
Figure 3:
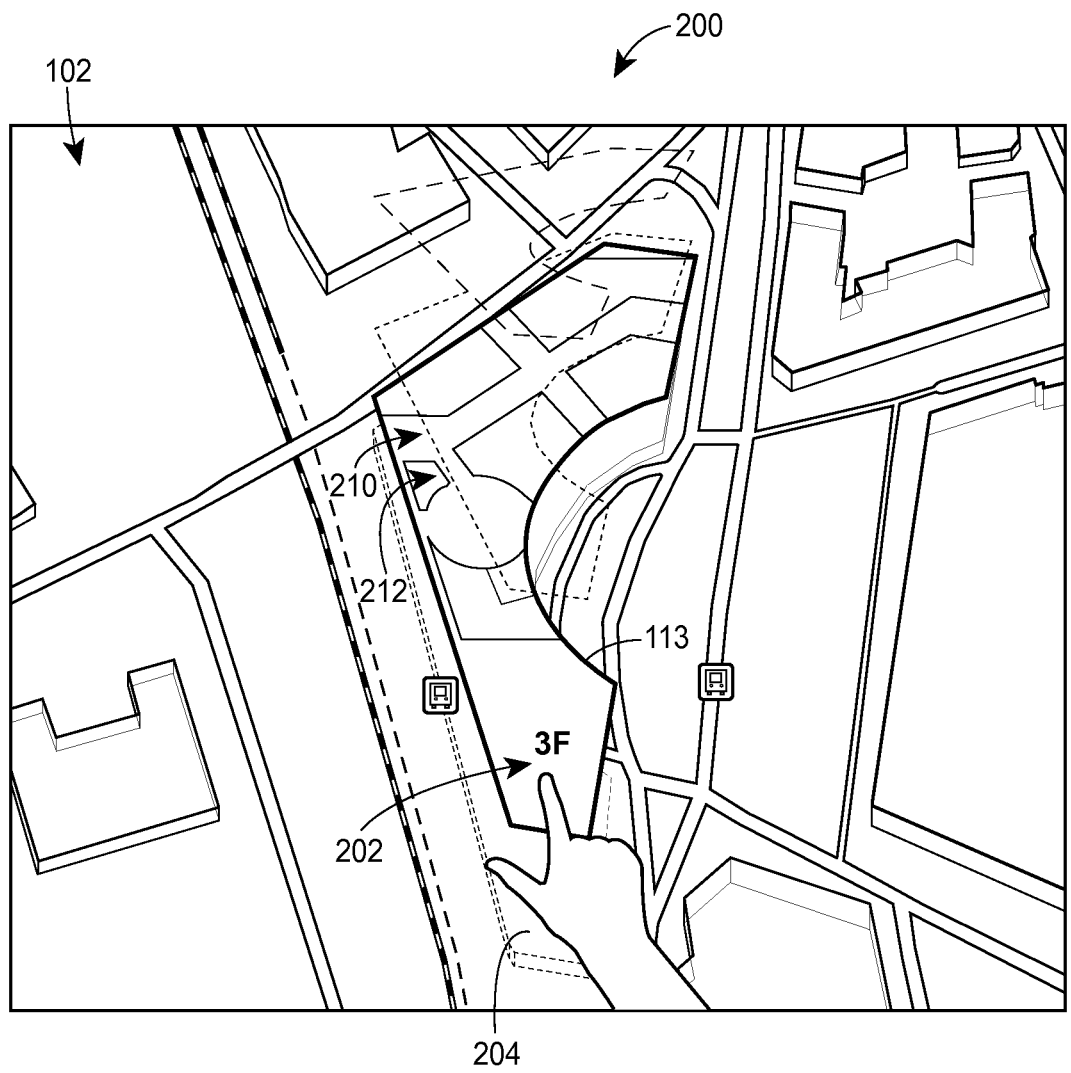
FIG. 3 is an example screenshot that illustrates a floor map selected from among the several floor maps of a multi-story building, with the internal features of the selected floor map being displayed differently than the internal features of unselected floors.

Now referring to FIGS. 2 and 3, an example screenshot 100 illustrates an expanded representation 104 of a multi-story building overlaying a map of a geographic area 102. Indoor and outdoor map data are displayed within a same viewport in this example. The representation 104 includes several stacked, individually selectable floor maps 111-115. When a user selects the floor map 113 corresponding to Floor 3 of the building, the internal features of the selected floor are brought to the foreground, as an example screenshot 200 illustrates in FIG. 3.

In this example, the map 102 illustrates several city blocks and includes various outdoor map elements such as roads 120, railroad tracks 122, and low-detail outlines of buildings 124 and 128. The map 102 also can include icons and text labels corresponding to outdoor map data, such as a map transit icon 130, for example. Although the map 102 is a 2D map on which most map elements are illustrated with a one-point projection, the expanded representation 104 in general can overlay any other suitable type of a map such as a 3D map, for example. A mapping software (e.g., the internal building feature inspection module 44 operating in the mapping software module 40 of FIG. 1 or a similar module) may provide functions for interacting with outdoor map data such as rotate, zoom, pan, etc., as well as functions for inspecting internal features of buildings when indoor map data is available. The screenshot 100 corresponds to the scenario in which the user selected the multi-story building by clicking or tapping on the corresponding low-detail outline, for example, and the mapping software in response generated the expanded representation 104.

The low-detail outline 124 or 128 provides a general indication of the shape of the building. The outline 124 or 128 typically does not provide a high-level of detail such the shape of every external wall or the ornamental features of the buildings, nor does the outline 124 illustrate internal features of the building. In the example of FIG. 2, the low-detail outlines 124 and 128 are 3D shapes displayed according to an isometric projection. In another implementation, however, these outlines can be illustrated with a two-point perspective. More generally, and as discussed above, buildings and other structures for which indoor map data is available generally can be illustrated using any suitable 2D or 3D shapes rendered with any desired level of detail.

According to some implementations, the mapping software provides an indication of whether indoor map data is available for an outdoor map element by changing the cursor, for example, or highlighting the map element upon detecting a hover event. In this manner, the user need not click or tap on a map element illustrating a building only to find out that internal map data for the building is unavailable.

As best seen in FIG. 2, the floor maps 111-115 are laid out on different planes tilted relative to the plane of the screen to provide a 3D view of the internal features of the corresponding building. The floor maps 111-115 partially overlap to more efficiently utilize screen real estate. However, in other implementations, floor maps may not overlap at all. Similar to low-detail 3D outlines, the stack of floor maps 111-115 is displayed according to an isometric projection, although it is possible to display the stack of floor maps 111-115 with a two-point perspective, for example. Until selected, the floors maps 111-115 are displayed as contours free of internal floor features. In embodiments according to which floors maps 111-115 display some or all internal floor features even when inactive, the floor maps 111-115 may be partially or fully opaque, so that some of the floor maps can partially occlude other floor maps and thereby reduce clutter on the screen.

When a user scrolls through the internal features of the building using a swipe gesture, the floor maps 111-115 that fall within the range of the swiping motion are consecutively activated and deactivated, so that only of the floors maps 111-115 is activated at any one time. Thus, for example, if the user makes a generally upward motion in the vicinity of a point 150, first the floor map for floor three is activated, then the floor map for floor three is deactivated and the floor map for floor two is activated, and then the floor map for floor two is deactivated and the floor map for one two is activated. This floor map may remain activated until the user makes another swiping motion, or, in another implementation, the floor map is automatically deactivated after a predetermined time interval in the absence of a selection. As another example, when an expanded representation of a sixty-story skyscraper is being displayed, and the user makes a relatively quick, generally downward swiping motion over a point within this expanded representation that falls approximately on floor 23, the floor maps between floors 23 and 42 are consecutively activated, until the momentum of the swiping gesture is exhausted at floor 42. Moreover, the floors in this example scenario may be scrolled progressively slower.

The mapping software may indicate the currently activated floor by highlighting the floor map, changing the thickness and/or color of lines defining the floor contour, or in any other suitable manner. More generally, the mapping software may change the visual attributes of the activated floor map relative to the other floor maps.

Once the user selects floor three, a detailed floor map 202 illustrated in FIG. 3 is displayed. The detailed floor map 202 is generated using indoor map data and illustrates, in addition to the contours of the floor, hallways 210 and rooms or offices 212, although in general the detailed floor 202 can depict any available indoor floor features. In the example of FIG. 3, the detailed floor map 202 is brought to the foreground so that no part of the detailed floor map 202 is occluded by any of the floor maps of lower or higher floors. Further, to make the display of the detailed floor map 202 more prominent, the floor maps 112, 112, 114, and 115 are either completely removed or are displayed as ghost lines, as illustrated in FIG. 3. Still further, once the floor map for floor three is selected, a low-detail 3D outline 204 of the multi-story building is displayed using ghost lines.

With continued reference to FIGS. 2 and 3, the user may tap on a point on the map 102 that is outside the expanded representation 104 or move the viewport so that the expanded representation 104 is no longer visible. In response, the mapping software may revert to the mode in which the user interacts with outdoor map data. In particular, the expanded representation 104 may collapse to the low-detail representation 204.

It is noted that internal building feature inspection module 44 that implements the techniques discussed with reference to FIGS. 1-3 provides an intuitive interface for inspecting indoor map data, separately or in conjunction with outdoor map data, without requiring that the user operate additional controls (such as a floor selector with multiple radio buttons displayed over the map) and without occluding significant portions of the map.

To further illustrate the techniques for providing an intuitive and efficient interface for inspecting indoor and outdoor map data, example methods which the internal building feature inspection module 44 may implement are discussed next with reference to FIGS. 4 and 5. More generally, these methods can be implemented in any suitable computing device and any suitable software application. For example, these methods can be implemented as sets of instructions stored on a computer-readable medium and executable on a processor.

Figure 4:
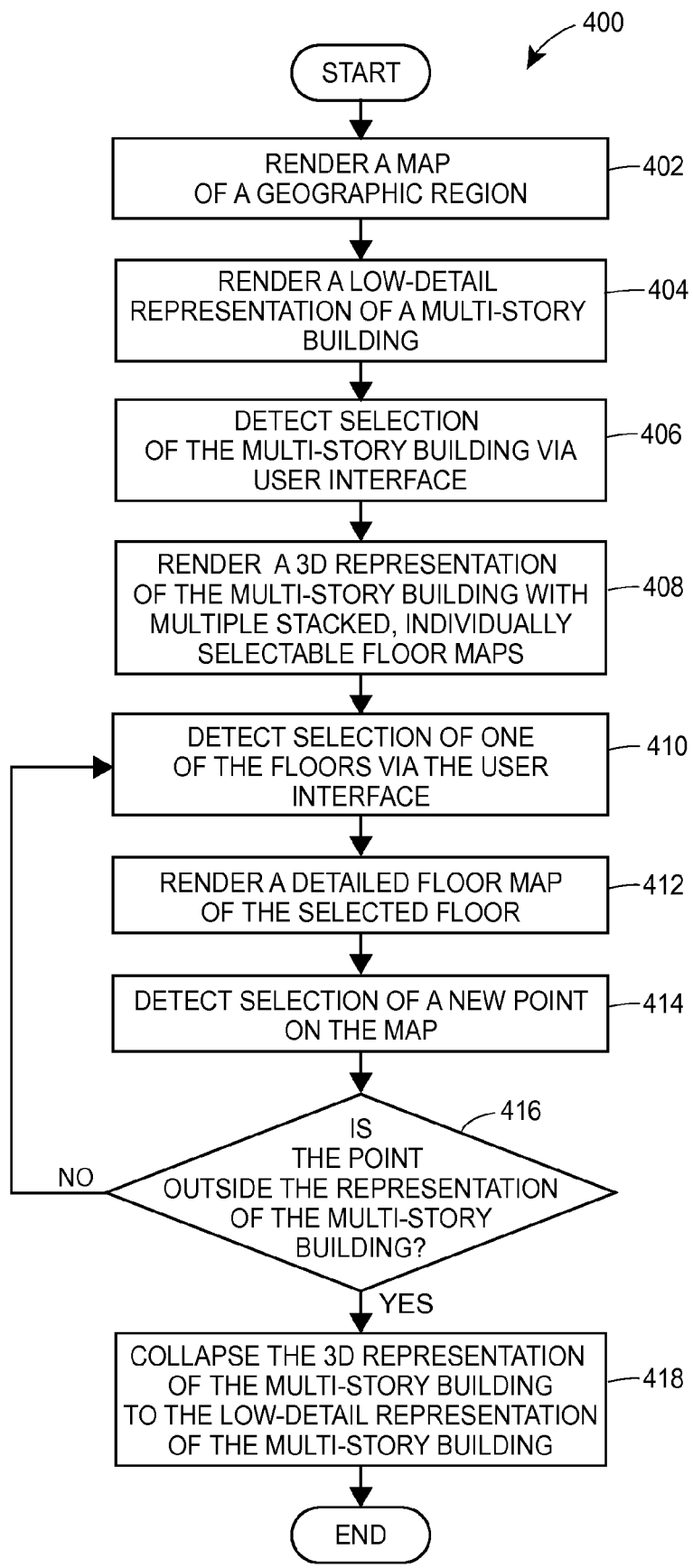
FIG. 4 is a flow diagram of an example method for displaying a representation of a multi-story building on a map of a geographic region.

The flow diagram of FIG. 4 illustrates an example method 400 for displaying a representation of a multi-story building on a map of a geographic region. At block 402, an interactive digital map of a geographic region is rendered. The rendered digital map may be rendered using outdoor map data and may display map elements such as roads, buildings, parks, bodies of water, etc. A low-detail representation of a multi-story building is rendered at block 404. As discussed above, a low-detail representation is only one example of a suitable external representation of the building. In other embodiments, the external representation may be a detailed 3D representation textured with photographs of the building.

Next, at block 406, a selection of the multi-story map on the digital map is detected. The selection may correspond to a tap event, for example, if a touch interface is used. An extended 3D representation of the multi-story building having multiple stacked, individually selectable floor maps is rendered at block 408. Referring back to FIG. 2, this representation may be similar to the representation 104.

At block 410, a selection of one of the floors is detected via the user interface. As one example, the user scrolls through several floor maps until she reaches the desired floor and taps on the corresponding floor map to indicate her selection. In response, a detailed floor map of the selected floor 412 is rendered at block 412. The detailed floor map may display geometric shapes, icons, photography, text, etc. to illustrate various internal floor features. When a selection of a new point on the digital map is selected (block 414), it is determined whether the new point is outside the expanded representation of the multi-story building (416). If the new point is inside the expanded representation, the floor returns to block 410, where a new or the same floor is selected. Otherwise, the flow proceeds to block 418.

At block 418, the extended 3D representation of the multi-story building is collapsed back to the low-detail representation of the same building. In this manner, the user can effectively switch between the outdoor map data inspection mode and the indoor map data inspection mode.

Figure 5:
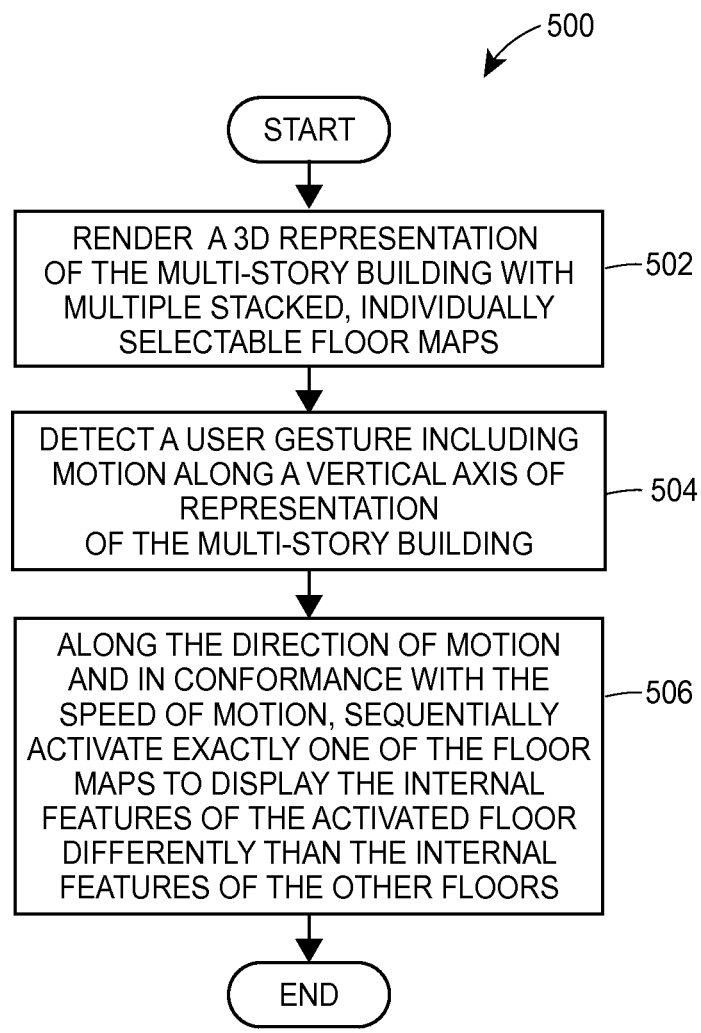
FIG. 5 is a flow diagram of an example method for displaying internal features of a multi-story building in response to gesture-based user input.

FIG. 5 is a flow diagram of an example method 500 for displaying internal features of a multi-story building in response to gesture-based user input. More particularly, a software module may implement the method 500 to allow a user to browse through floor maps of a multi-story building. The method 500 can be invoked, for example, at blocks 408-410 of the method 400 discussed above.

At block 502, a 3D representation of a multi-story building is rendered similarly to the block 408 discussed with reference to FIG. 4. Next, at block 504, a user gesture is detected. The gesture, such as the scrolling gesture, includes the motion of a finger along a vertical axis of the 3D representation of the building. In another implementation, however, the motion may include a motion along a different axis, such as the horizontal axis.

According to the method 500, floor maps are consecutively activated at block 506. More particularly, exactly one floor map is activated at a time, and the activation proceeds sequentially along the direction of motion and according to the speed at which the user moves or flings his finger along the touchscreen. Alternatively, the sequential activation of floor maps can proceed in the opposite direction. The internal features of the activated floor are displayed differently than the internal features of other, inactivated floors.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing an interface for inspecting indoor and outdoor map data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a computing device having a user interface for providing an interactive display of multi-story buildings displayed on a map, wherein the user interface is configured to receive gesture-based input, the method comprising:
   displaying a digital map of a geographic area via the user interface;
   displaying, on the digital map, a three-dimensional (3D) representation of a multi-story building located in the geographic area, including displaying a plurality of stacked, individually selectable floor maps corresponding to a plurality of floors of the multi-story building;
   detecting, via the user interface, a scrolling gesture over a point within the 3D representation of the building that includes a motion in a direction substantially along a vertical axis of the 3D representation of the building; and
   consecutively activating the plurality of floor maps in response to detecting the scrolling gesture in an order of scrolling to thereby create an animation effect, including changing visual attributes of the activated floor map relative to every other one of the plurality of floor maps, wherein no more than one of the plurality of floor maps is activated at one time.

2. The method of claim 1, wherein displaying the plurality of stacked, individually selectable floor maps includes displaying the plurality floor maps in a partially overlapping manner, wherein:
   a first one of the plurality floor maps, when activated, partially occludes a second one of the plurality floor maps, and
   the second one of the plurality floor maps, when activated, partially occludes the first one of the plurality floor maps.

3. The method of claim 1, further comprising:
   displaying internal floor features for the activated floor map, including displaying one or more of (i) internal wall layout, (ii) names of businesses or individuals occupying portions of the activated floor, and (iii) indication of location of building facilities; and
   displaying respective floor contours free of internal floor features for the remaining ones of the plurality of floor maps.

4. The method of claim 3, wherein the internal floor features for the activated floor map are displayed in response to receiving a confirmation of selection of the activated floor map via the user interface.

5. The method of claim 1, wherein detecting the scrolling user gesture includes detecting a speed associated with the motion, and wherein the plurality of floor maps are consecutively activated at a rate proportional to the detected speed.

6. The method of claim 1, wherein changing the visual attributes of the activated floor map includes at least one of (i) highlighting the activated floor map, (ii) changing line thickness properties of the activated floor map, and (iii) changing color properties of lines defining external boundaries of the activated floor map.

7. The method of claim 1, wherein displaying the 3D representation of a multi-story building is in response to receiving a selection of the multi-story building via the user interface; the method further comprising displaying a low-detail representation of the multi-story building free of individually selectable floor maps when the multi-story building is not selected.

8. A method in a computing device for providing a digital map of outdoor and indoor locations via a user interface, the method comprising:
    displaying a digital map of a geographic area within a viewport on the user interface, wherein the digital map includes a plurality of map elements representing outdoor physical entities;
    displaying an external representation of a multi-story building located in the geographic area within the viewport;
    receiving a selection of a point on the digital map via the user interface;
    in response to determining that the selected point is within the external representation of the multi-story building:
        generating an expanded representation of the multi-story building, including simultaneously displaying a plurality of floor maps corresponding to different floors of the multi-story building, and
        consecutively activating a display of the plurality of floor maps in response to detecting a scrolling gesture that operates directly on the expanded representation of the multi-story building, the scrolling gesture including a motion in a direction substantially along a vertical axis of the expanded representation of the building, including activating the display of the plurality of floor maps in an order of scrolling to thereby create an animation effect; and
    in response to determining that the selected point is outside the external representation of the multi-story building, providing a plurality of functions for changing the display of the plurality of map elements representing outdoor physical entities.

9. The method of claim 8, wherein the selected point on the digital map is a first point, and wherein activating the display of the one of the plurality of floor maps includes detecting a selection of a second point that is within the one of the plurality of floor maps and outside the remaining ones of the plurality of floor maps.

10. The method of claim 8, wherein activating the display of one of the plurality of floor maps includes changing visual attributes of the activated floor map relative to every other one of the plurality of floor maps.

11. The method of claim 8, wherein the plurality of floor maps are displayed as a stack in partially overlapping manner, and wherein activating the display of one of the plurality of floor maps includes bringing the activated floor map to a foreground whereby no part of the activated floor map is occluded by any other one of the plurality of floor maps.

12. The method of claim 8, wherein generating the expanded representation of the multi-story building includes displaying the plurality of floor maps on a plurality of respective planes arranged in a stack and displayed in a perspective view.

13. The method of claim 8, wherein displaying the plurality of floor maps includes displaying a respective contour for each of the plurality of floor maps without displaying internal features of the corresponding floor when none of the floors of the multi-story building is selected.

14. The method of claim 8 wherein no more than one of the plurality of floor maps is activated at one time.

15. The method of claim 14, further comprising:
    receiving a confirmation of selection of the activated floor map via the user interface; and
    displaying internal floor features for the selected floor map, including not displaying internal floor features for any other one of the plurality of floor maps.

16. The method of claim 8, wherein the plurality of functions for changing the display of the plurality of map elements include at least one of pan, zoom, and rotate.

17. A method in a computing device having a user interface for providing an interactive display of multi-story buildings displayed on a map, wherein the user interface is configured to receive gesture-based input, the method comprising:
    displaying a digital map of a geographic area via the user interface;
    displaying, on the digital map, a three-dimensional (3D) representation of a multi-story building located in the geographic area, including displaying a plurality of stacked, individually selectable floor maps corresponding to a plurality of floors of the multi-story building;
    detecting, via the user interface, a scrolling gesture that operates directly on the 3D representation of the multi-story building, the gesture including a motion in a direction substantially along a vertical axis of the 3D representation of the building; and
    consecutively activating one of the plurality of floor maps in response to detecting the gesture in an order of scrolling to thereby create an animation effect, including changing visual attributes of the activated floor map relative to every other one of the plurality of floor maps.

* * * * *